United States Patent
Damkjær

(10) Patent No.: US 10,427,173 B2
(45) Date of Patent: Oct. 1, 2019

(54) POWDER DRYING SYSTEM AND METHOD FOR RECOVERING PARTICLES IN SUCH A SYSTEM

(71) Applicant: GEA Process Engineering A/S, Søborg (DK)

(72) Inventor: Kasper Berthu Damkjær, Hellerup (DK)

(73) Assignee: GEA PROCESS ENGINEERING A/S, Søborg (DK)

( * ) Notice: Subject to any disclaimer, the term of this patent is extended or adjusted under 35 U.S.C. 154(b) by 0 days.

(21) Appl. No.: 16/067,355

(22) PCT Filed: Jan. 8, 2016

(86) PCT No.: PCT/DK2016/050006
§ 371 (c)(1),
(2) Date: Jun. 29, 2018

(87) PCT Pub. No.: WO2017/118459
PCT Pub. Date: Jul. 13, 2017

(65) Prior Publication Data
US 2019/0009282 A1    Jan. 10, 2019

(51) Int. Cl.
*B01D 45/12*     (2006.01)
*B04C 5/13*      (2006.01)
(Continued)

(52) U.S. Cl.
CPC ............... *B04C 5/13* (2013.01); *B01D 45/16* (2013.01); *B01D 50/002* (2013.01); *B04C 5/04* (2013.01);
(Continued)

(58) Field of Classification Search
CPC .... B04C 5/13; B04C 5/04; B04C 5/24; B04C 2009/002; B04C 2009/005; B01D 50/002; B01D 45/16
See application file for complete search history.

(56) References Cited

U.S. PATENT DOCUMENTS 1,267,715 A     5/1918   Tutwiler
1,928,702 A  *  10/1933  O'Mara ................... B04C 5/24
                                                        209/710
(Continued)

FOREIGN PATENT DOCUMENTS

AT          411 872 B       11/2008
DK       2015 70712 A1      11/2015
(Continued)

*Primary Examiner* — Dung H Bui
(74) *Attorney, Agent, or Firm* — Condo Roccia Koptiw LLP

(57) ABSTRACT

A cyclone (4) for separation of solids and gases comprising a predefined circumference and at least one inlet (42a), for supplying a mixed stream of powder and air/gas, a first outlet in the form of a powder outlet (43) at the bottom of the cyclone (4) for extracting powder, a vortex finder (45) at the top of the cyclone, said vortex finder (45) further comprising a wall (50) and a second outlet in the form of an air/gas outlet (44) for extracting air/gas, characterized in that said cyclone (4) comprises a secondary powder extraction system (46) including a third outlet (48a), located in or at the vortex finder (45) to extract powder particles from the mixed stream entering the vortex finder (45).

18 Claims, 12 Drawing Sheets

(51) Int. Cl.
  *B04C 5/04*     (2006.01)
  *B01D 45/16*    (2006.01)
  *B01D 50/00*    (2006.01)
  *B04C 5/24*     (2006.01)
  *B04C 9/00*     (2006.01)

(52) U.S. Cl.
  CPC .......... *B04C 5/24* (2013.01); *B04C 2009/002* (2013.01); *B04C 2009/005* (2013.01)

(56) References Cited

U.S. PATENT DOCUMENTS

| | | | | |
|---|---|---|---|---|
| 2,756,878 A * | 7/1956 | Herkenhoff | ............. | B04C 5/081 209/727 |
| 4,278,452 A * | 7/1981 | Ido | ............. | B04C 5/13 55/339 |
| 4,622,150 A * | 11/1986 | Carroll | ............... | B01D 17/0214 210/739 |
| 6,596,169 B1 * | 7/2003 | Rong | ........................ | B04C 5/04 209/719 |
| 2012/0067214 A1 * | 3/2012 | Ribera Salcedo | ........ | B03C 3/15 95/69 |
| 2016/0271627 A1 * | 9/2016 | Chirtu | ........................ | B04C 5/04 |

FOREIGN PATENT DOCUMENTS

| | | |
|---|---|---|
| FR | 1 456 617 A | 7/1966 |
| WO | WO 03/089148 A1 | 10/2003 |
| WO | WO 2008/147233 A2 | 12/2008 |
| WO | WO 2015/075702 A1 | 5/2015 |

* cited by examiner

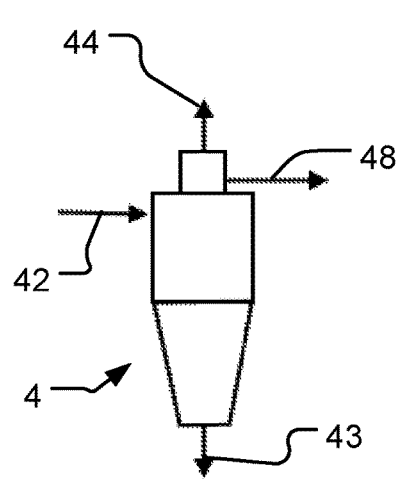
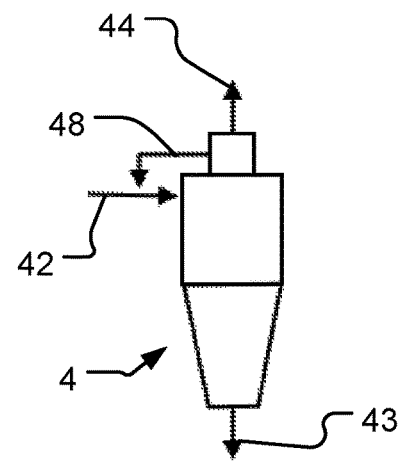
Fig. 12a          Fig. 12b
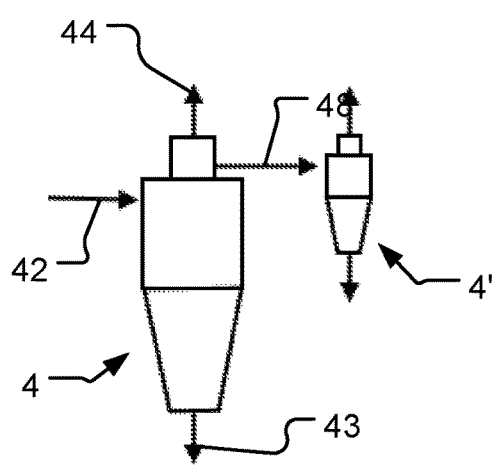
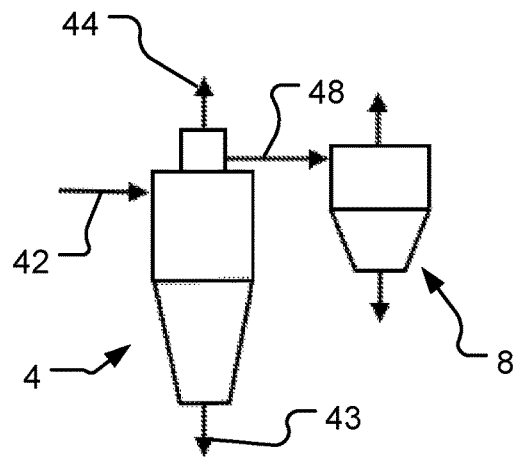
Fig. 12c          Fig. 12d

POWDER DRYING SYSTEM AND METHOD FOR RECOVERING PARTICLES IN SUCH A SYSTEM

CROSS REFERENCE TO RELATED APPLICATIONS

This application is the National Stage Entry under 35 U.S.C. § 371 of Patent Cooperation Treaty Application No. PCT/DK2016/050006, filed Jan. 8, 2016, the contents of which are hereby incorporated by reference herein.

FIELD OF INVENTION

The present invention relates to a cyclone for separation of solids and gases, said cyclone comprising a predefined circumference and at least one inlet, for supplying a mixed stream of powder and air/gas, a first outlet in the form of a powder outlet at the bottom of the cyclone for extracting powder, a vortex finder at the top of the cyclone, said vortex finder further comprising a wall and a second outlet in the form of an air/gas outlet for extracting air/gas. The invention furthermore relates to a powder drying and/or handling system, as well as a method for recovering particles in such a system.

BACKGROUND OF THE INVENTION

In the field of powder drying, high demands on efficiency of the system are present in general, and a particular area of demand is the separation of dried products and process air/gas.

When drying powder products, a mixture of air/gas and dried powder particles exits a main powder drying processing unit, and enters a number of separation units. These units include cyclones and bag filter units, which can be combined in any number of ways. The function of cyclones and bag filters in a powder drying system is to separate the dried powder particles from the process gas/air. However there are limitations as to how high a percentage, of the dried powder particles, can be extracted from the mixture, at a given step. Cyclones, for example, can extract a fraction of especially larger particles, at a fairly low energy consumption, but are limited in regards to extracting the smaller particles. Bag filters are on the other hand effective at extracting even small particles from a mixed stream of air/gas and powder particles, as the particles will collect at the surface of the filters. However, bag filters have larger energy consumption, and also require more cleaning, as there is a larger number of components and a higher rate of filters being filled by dried powder particles.

In some fields, such as the pharmaceutical field, particularly concerning inhalable pharmaceutical substances, there is an increased demand on avoiding bag filters, as possible fibers from the bag filters may be detrimental to the final product, and should be avoided all together.

Further, in the field of powder drying systems, there is a high demand on reducing the overall size of the powder drying systems, in comparison to the dried powder product yield, as factory space is limited and costly.

There is an increasing demand on separation systems, which can increase the yield efficiency and/or reduce the energy consumption of the separation units. Some attempts at this have been made, such as the system used in WO 2015/075702 A1 or WO 2008/147233 A2, which uses a recirculation system. As usual, the cyclone separates a part of the mixed stream, by extracting a portion of dried powder at the powder outlet at the bottom of the cyclone. The remaining mixture of air/gas and dried powder particles exits the cyclone through the air outlet at the top of the cyclone. Upon exit of the cyclone, the mixed stream enters a swirl tube. Here a portion of the powder particles in the mixed stream agglomerate to larger particles, which are then extracted at the exit portion of the swirl tube and re-entered into the inlet stream of the cyclone. This, however, has the disadvantage of a high increase in energy consumption, as the pressure drop from inlet to outlet is much higher. Further, it has a disadvantage of being large, as the swirl tube is substantially the same size as the cyclone.

SUMMARY OF THE INVENTION

With this background, it is therefore an object of the present invention to provide a gas/particle separation cyclone, by which it is possible to perform efficient, compact and cost-effective separation of dried powder product and air/gas. In a first aspect of the inventive concept, these and further objects are obtained by a cyclone of the kind mentioned in the introduction, which is furthermore characterized in that said cyclone comprises a secondary powder extraction system including a third outlet, located in or at the vortex finder to extract powder particles from the mixed stream entering the vortex finder.

One aspect of the invention comprises at least one cyclone of a gas-solid separator type, having a top, a bottom and a cyclone wall. The cyclone wall further defines an outer circumference. Inside said predefined circumference the cyclone comprises at least one inlet, preferably near the top, a first outlet in the form of a powder outlet, preferably near the bottom, a vortex finder near the top, the vortex finder further comprising a second outlet in the form of an air/gas outlet, and a secondary powder extraction system, including a third outlet. A secondary powder extraction system integrated in the cyclone top design allows for a very compact design. As powder particles in the vortex finder are "lost" by exiting through the air/gas outlet, extracting these in the secondary powder extraction system will increase the separation efficiency.

By analyzing the particle flow through the cyclone, a surprising event was found. When the mixed stream enters the vortex finder, substantially all of the powder particles are situated near the vortex finder walls and the stream at the center of the vortex finder is primarily air/gas. Therefore it is possible to extract a high percentage of the powder particles in the vortex finder, without using a separate unit, such as a swirl tube, by extracting the part of the mixed stream which is closest to the vortex finder walls.

By extracting the powder particles directly from the vortex finder, it is possible to reduce the size of the secondary extraction system. By having a compact system, not only does the system reduce the needed factory space available, but it further reduces the number of components and surface area which requires cleaning. This reduces down time of the production process, where the time used for cleaning programs is a major contributor to lower yields.

In an embodiment of the invention, the secondary powder extraction system comprises a secondary powder extraction system located in the vortex finder to extract powder particles from the mixed stream entering the vortex finder. This allows the mixed stream entering the vortex finder to separate by itself into a stream entering the secondary powder extraction system and a stream entering the vortex finder outlet.

In another embodiment, the secondary powder extraction system comprises a tangential outlet for extracting the powder particles from the vortex finder. By using a tangential outlet, less energy is used in redirecting the stream of powder particles, as these are travelling at the perimeter of the cyclone, and can as such simply continue in a straight line, entering the tangential outlet of the secondary powder extraction system.

In an embodiment of the invention the powder particles are adapted to be sucked from the outlet of the secondary powder extraction system by use of a pump, fan or other flow generating means. In order to extract the powder particles from the vortex finder and transport them to another unit of the powder drying system, a pressure difference must be made, such that the pressure at the secondary powder extraction system outlet of the vortex finder is higher than the pressure at the end of the secondary powder extraction system going to another unit.

In another embodiment, the vortex finder wall has a bent lower edge, such as to act as a funnel for the mixed stream entering the vortex finder. By adding the bent edge, more particles from the mixed stream can enter the vortex finder.

In an embodiment of the invention the secondary powder extraction system is configured to recirculate said powder particles into the inlet. This is done by connecting the secondary powder extraction system outlet to the inlet tube of the cyclone. By doing this, the powder particles will enter the cyclone again, and a greater chance of being extracted at the powder outlet is achieved. Further, when recirculating small powder particles, there is a chance of these agglomerating with either each other, or with the larger powder particles in the inlet stream. In general, the larger the particles, the higher chance of being extracted at the powder outlet, and not entering the vortex finder.

In a further embodiment, the cyclone inlet tube comprises a venturi duct, and wherein said cyclone comprises a pipe from the secondary extraction system outlet to the venturi duct, so that powder particles extracted from the secondary powder extraction system outlet are adapted to be sucked into the inlet stream, by the venturi effect caused by the venturi duct. A venturi duct decreases the cross-sectional area, through which the mixed stream flows into the cyclone. This decrease in cross-sectional area, increases the mixed stream velocity, and thus decreases the pressure in the venturi duct. By connecting the pipe of the secondary powder extraction system to the part of the venturi duct with a reduced cross sectional area, the pressure from the vortex finder, will push a flow through the secondary powder extraction system, towards the lower pressure in the venturi duct. After the venturi duct, the stream velocity decreases again, as the cross-sectional area increases, and as such, the pressure increases again. Thus the recirculation of the powder particles is achieved at only a small increase in system pressure drop, which correlates to a small increase in energy consumption.

In an embodiment of the invention, the secondary powder extraction system transports the extracted powder particles into a dedusting system e.g. another cyclone, a bag filter unit or a main feed for the powder drying system. This can increase the efficiency of the overall system, as the mixed stream extracted from the secondary powder extraction system can enter a much smaller cyclone or bag filter, compared to the prior art systems, where the mixed stream exiting the cyclone through the air/gas outlet enters a secondary cyclone or bag filter. By extracting most of the powder particles the resulting mixed stream will have a smaller flow rate, and thus a secondary cyclone or bag filter can be smaller in size, in order to efficiently separate the remaining powder particles from the air/gas. This results in both a smaller size of the overall powder drying system, as well as a decrease in the energy consumption of the secondary cyclone or bag filter. Further, the output from the secondary powder extraction system may be returned to the main powder drying system feed or process, by connecting the outlet of the secondary powder recovery system to a return line, which transports powder, which for one reason or another is deemed to be returned, to the powder drying processing unit. Thus the powder particles will be recycled through the powder drying process.

In a second aspect of the inventive concept, a powder drying system is provided, the powder drying system comprising a powder drying processing unit, at least one cyclone according to the first aspect of the inventive concept.

In a third aspect of the inventive concept, a method for recovering powder particles is provided, the method comprising the steps of:

a mixed stream of air/gas and dried powder particles are entered into a cyclone through an inlet, a first part of the mixed stream, preferably consisting substantially of powder particles, is separated from the stream at a powder outlet and said first part of the mixed stream is extracted from the cyclone, a second part of the mixed stream enters a vortex finder, the second part comprising a third part, said third part is separated from the second part in a secondary powder extraction system, the remaining part of the second part exits the cyclone through an outlet of the vortex finder.

In an embodiment of the invention, the method for recovering powder particles further comprises that the third part is recirculated to the mixed stream at the inlet.

In an embodiment of the invention, the method for recovering powder particles further comprises that the third part is transported into another cyclone, a bag filter unit or upstream in the powder drying system.

BRIEF DESCRIPTION OF THE DRAWINGS

The invention will be described in more detail below by means of non-limiting examples of presently preferred embodiments and with reference to the schematic drawings, in which:

FIGS. 12a to 12d are schematic views of a powder drying system according to embodiments of the invention.

DETAILED DESCRIPTION OF EMBODIMENTS OF THE INVENTION

Figure 1:
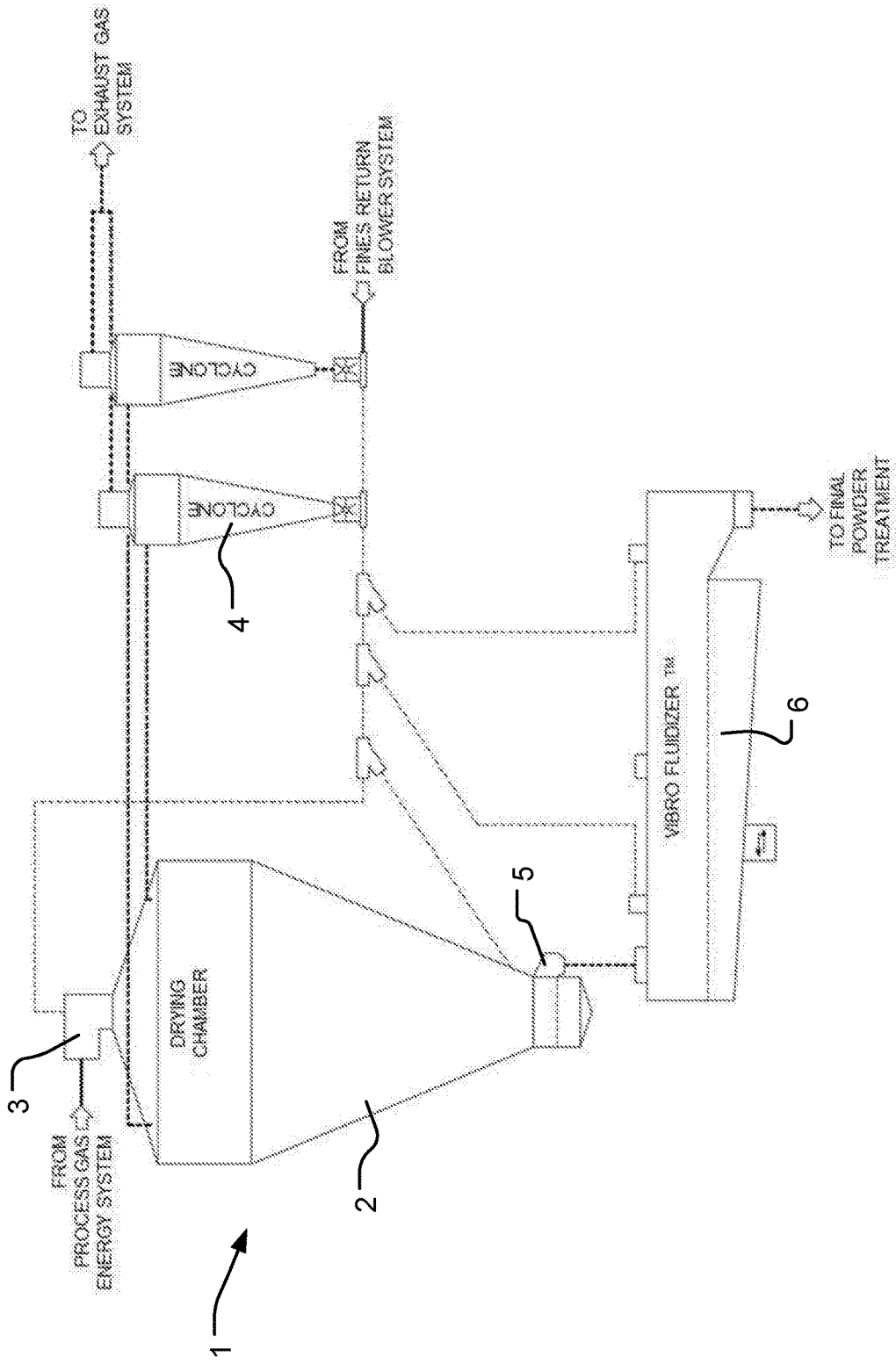
FIG. 1 shows a schematic view of the main components of a prior art powder drying system.

FIG. 1 shows a schematic view of the main components of a powder drying system in the form of a spray drying system 1. In a manner known per se, the spray drying system 1 comprises a spray dryer with a drying chamber 2 and a process air/gas supply device 3, typically including an air/gas disperser. It is noted that the term "gas" will be used alongside with the term "air" as "air/gas" and is to be interpreted as encompassing any gas that is suitable as process gas in such a spray drying system. The drying chamber 2 also incorporates atomizing means, such as nozzles and/or an atomizer wheel. The term "powder drying system" is intended to encompass such systems in which a powdery or particulate material is processed. The material may either be provided as a feed of powdery or particulate material, or as a liquid feed to be dried. The powder drying system is also intended to cover cooling of the particulate material. In addition or alternatively to the spray dryer described, such a system could include one or more fluid beds, flash dryers etc. The powder drying system thus incorporates a powder processing unit, and/or a powder handling system, here a spray dryer with a drying chamber.

At the lower end of the drying chamber 2, an outlet 5 for dried material is provided. In the shown spray drying system 1, an after-treatment unit in the form of vibrating or static fluid bed 6 is provided. At one end, the vibrating or static fluid bed 6 receives dried material from the outlet 5 of the drying chamber 2 for further treatment of the material, which is then to be collected at an outlet at the other end of the vibrating or static fluid bed. Further upstream or downstream equipment may be present as well, but is not relevant to the present invention.

Furthermore, the spray drying system 1 comprises a series of powder recovery units including a number of filter units, cyclones and/or bag filters, or any combination thereof. In the prior art system of FIG. 1 two cyclones 4 are shown, to which spent process air/gas with particles entrained in the process air/gas is conducted. The process air/gas conducted to the cyclones 4 can originate from the drying chamber 2 or the vibrating or static fluid bed 6. In the prior art system of FIG. 1, the two cyclones 4 are shown in a parallel connection, as to increase the capacity of the spray drying system 1. However, the cyclones 4 could be connected in a serial connection. The cyclone 4 has a configuration which will be described in further detail below.

A number of conveying lines connect the operational units with each other in a manner known per se and will not be described in detail.

The general configuration of such a prior art cyclone 4 comprises a tangential inlet pipe 42 near the top of the cyclone 4 for supplying a mixed stream of powder and air/gas, a powder outlet 43 at the bottom for extracting powder, a vortex finder 45 at the top, said vortex finder 45 further including an air/gas outlet 44 for extracting the air/gas.

Figure 2:
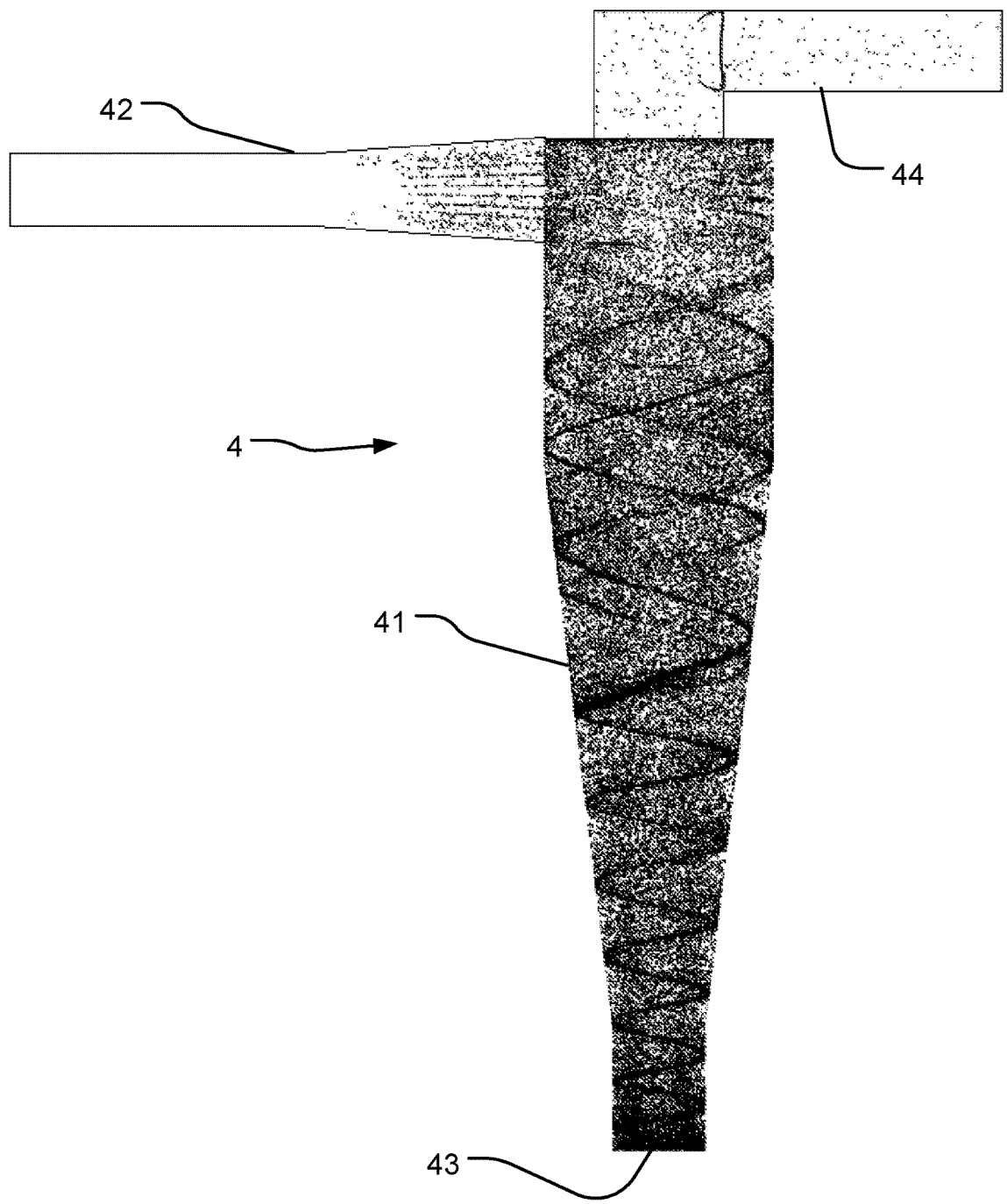
FIG. 2 shows a side view of the particle flow through a cyclone according to simulations of a prior art cyclone.
Figure 3:
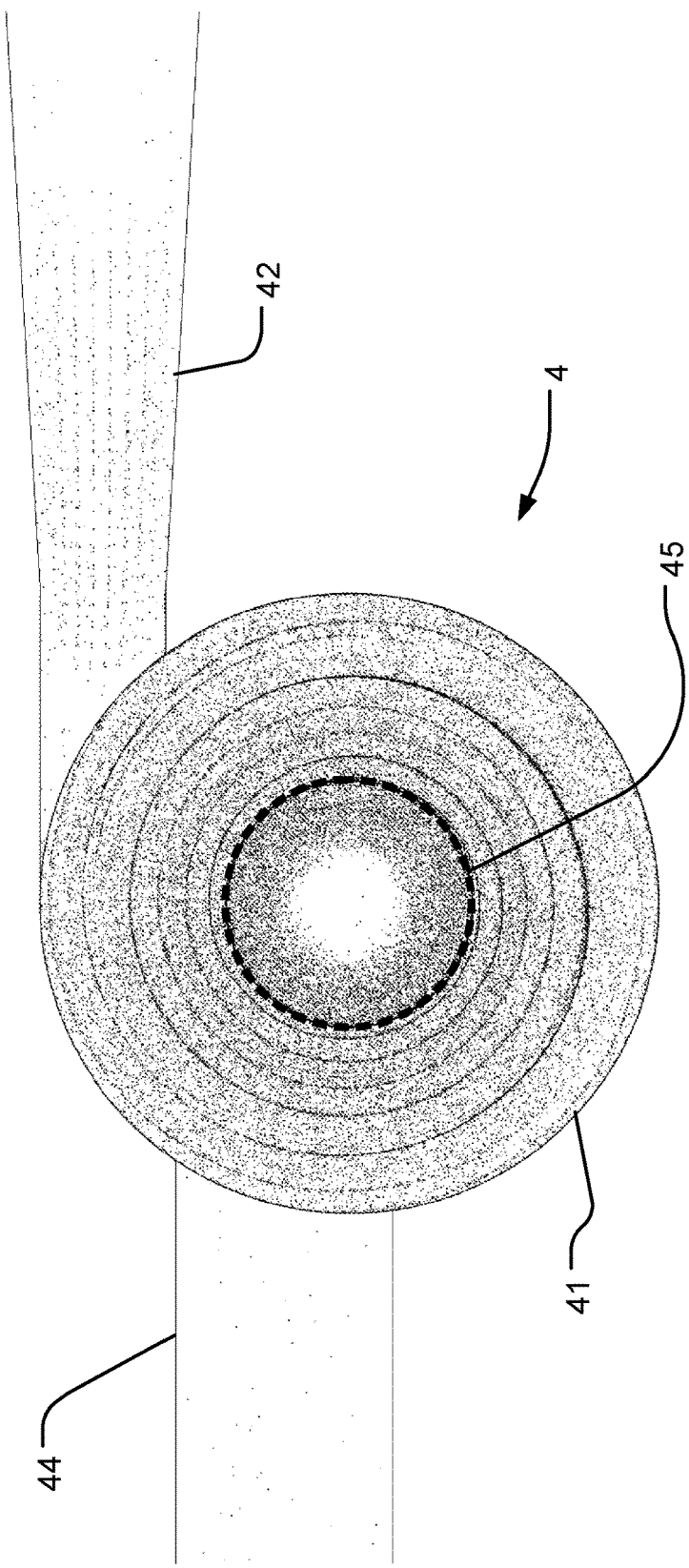
FIG. 3 shows a top view of the particle flow through a cyclone according to simulations of a prior art cyclone.

FIGS. 2 and 3 show a side and top view, respectively, of a prior art cyclone 4 during a simulation of the flow of powder particles and air/gas through the cyclone 4. As seen on FIG. 2, a mixed stream of air/gas and powder particles enters the cyclone through the inlet pipe 42. The particles move through the cyclone 4 and most of the powder particles are separated from the air/gas, and extracted at the powder outlet 43 at the bottom of the cyclone 4. The air/gas and some of the powder particles flow to the top of the cyclone 4, where they enter a vortex finder 45. Inside the vortex finder 45, the air/gas and powder particles exit the cyclone through the air/gas outlet 44 at the top. As seen on FIG. 2, the number of particles that exit the cyclone 4 through the air/gas outlet 44 is much smaller than the number of particles that enter the cyclone 4 through the inlet pipe 42.

As seen on FIG. 3, the mixed stream that enters the vortex finder 45 (shown by a dashed line) has a higher concentration of powder particles near the perimeter of the vortex finder 45, and a higher concentration of air/gas at the center of the vortex finder 45. This is a surprising effect.

Figures 4A, 4B:
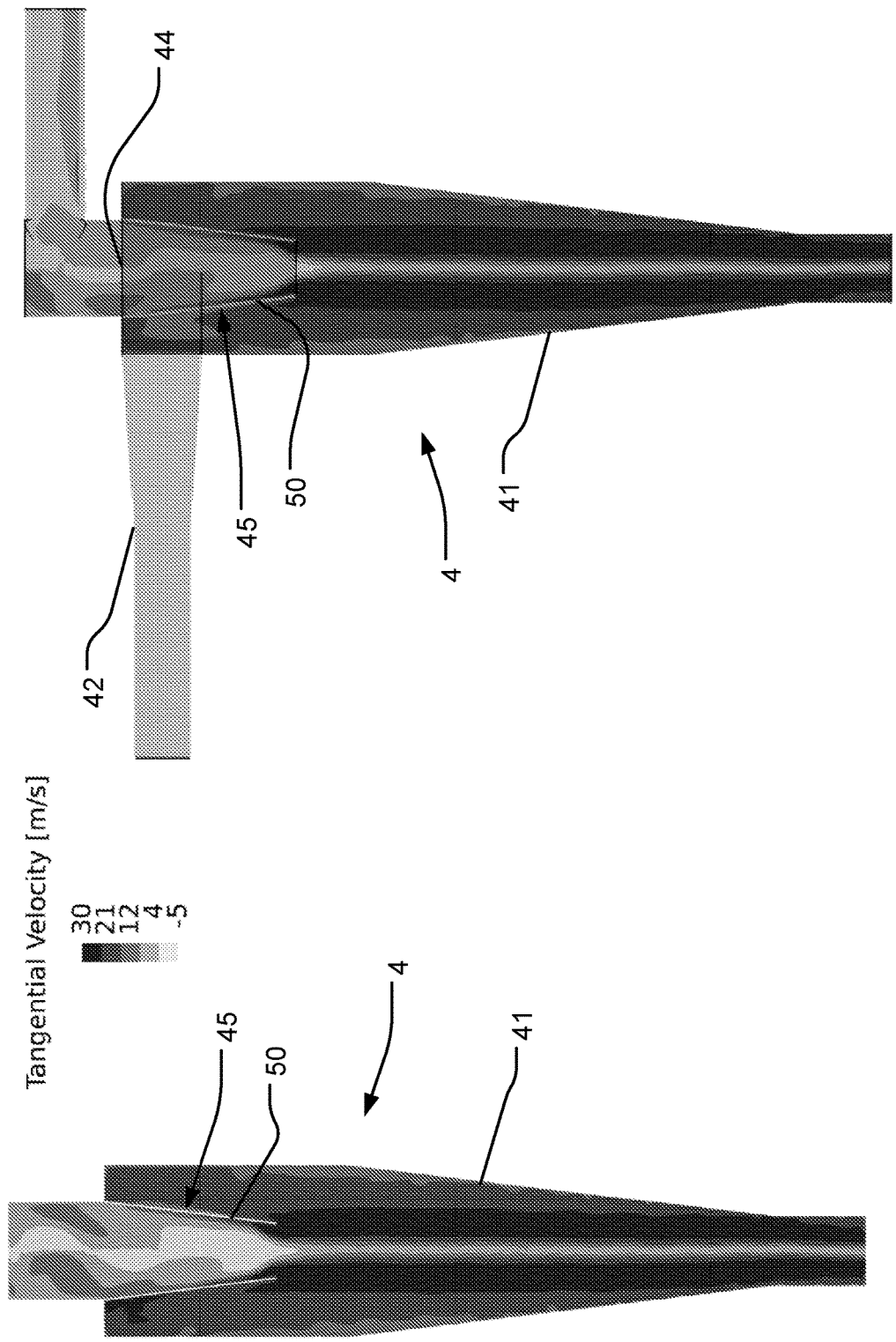
FIGS. 4a and 4b show side views of the tangential velocity of a stream in a cyclone according to simulations of a prior art cyclone.

FIGS. 4a and 4b show the tangential velocity of the stream in the cyclone 4, in a prior art cyclone 4. As to be expected, there is a high tangential velocity near the cyclone walls 41, as well as the center column rising from the bottom of the cyclone 4. However upon entering the vortex finder 45, the flow slows down and even reverses its tangential flow. This is indicative of a phenomenon known as vortex breakdown. This is highly inefficient in regards to cyclone energy efficiency.

Figures 5A, 5B:
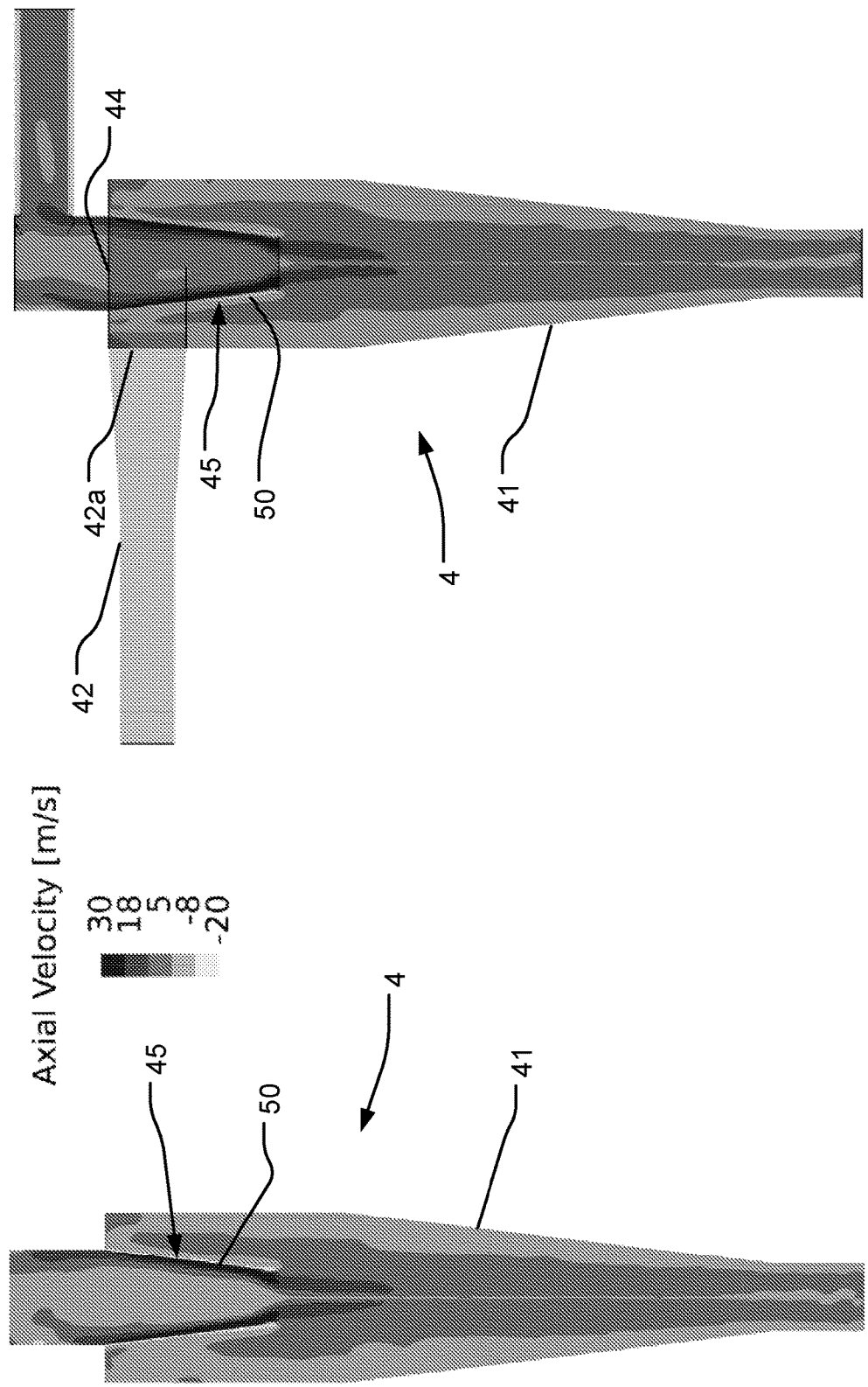
FIGS. 5a and 5b show side views of the axial velocity of a stream in a cyclone according to simulations of a prior art cyclone.

As seen in FIGS. 5a and 5b, showing the axial velocity of the stream in the cyclone 4, in a prior art cyclone 4. Here, there is an axial movement towards the bottom of the cyclone 4 for the stream which is near the cyclone walls 41. Further a primarily upwards flow is seen at the center of the cyclone 4. Both of these events are to be expected. However, due to the vortex breakdown in the vortex finder 45, further surprising effects occur. First of all, a stream having entered the vortex finder 45 reverses back towards the bottom of the cyclone 4. Secondly, the axial velocity near the vortex finder wall 50 increases, causing the particles near the vortex finder wall 50 to accelerate. This new knowledge combined with the knowledge that the powder particles are concentrated near the vortex finder wall 50, has led to the invention at hand.

Figure 6:
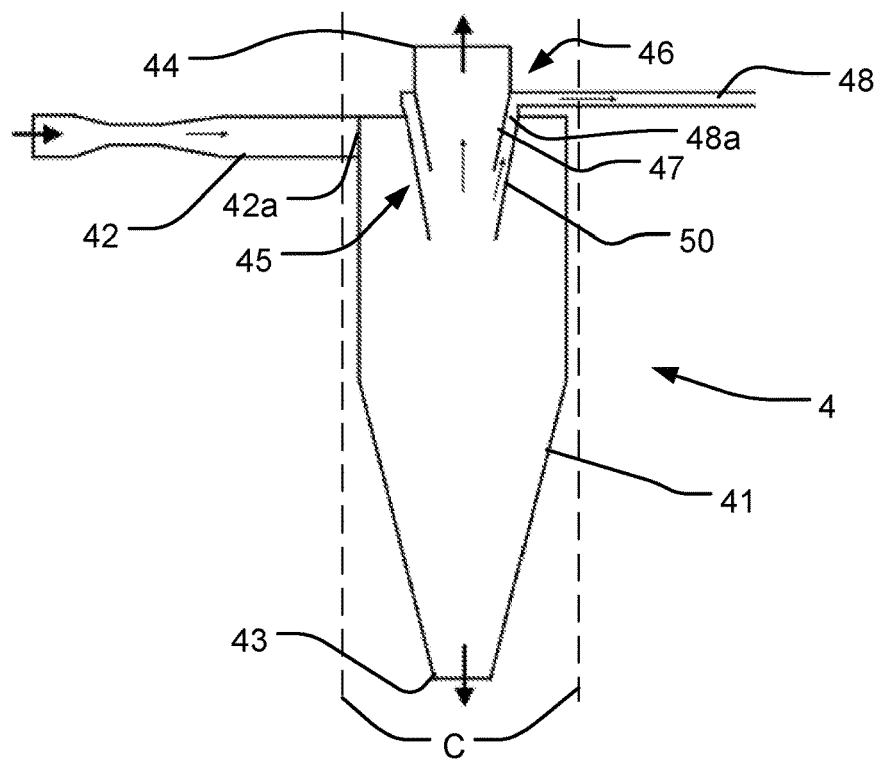
FIG. 6 is a cross-sectional view of a cyclone according to an embodiment of the invention.

Thus, an embodiment of a first aspect of the invention is seen in FIG. 6. A cyclone 4 having a top, a bottom and a cyclone wall 41 as in the prior art is shown. The cyclone wall 41 further defines an outer circumference C. Inside said predefined circumference C the cyclone 4 comprises a tangential inlet 42a. An inlet pipe 42 extends from outside the predefined circumference C to the inlet 42a. The inlet 42a could be one of a number of inlets to the cyclone 4. The cyclone 4 is provided with a number of outlets: A first outlet in the form of a powder outlet 43 at the bottom and a second outlet in the form of an air/gas outlet 44. Also a third outlet is provided to be defined in further detail below. A vortex finder 45 is located at the top of the cyclone, wherein the second outlet, namely the air/gas outlet 44, is comprised in the vortex finder 45. The vortex finder 45 comprises a wall 50.

The cyclone 4 according to the invention furthermore comprises a secondary powder extraction system generally designated 46. The secondary powder extraction system 46 comprises a third outlet 48a from the cyclone, leading to an outlet pipe 48.

In the embodiment shown in FIG. 6, the secondary powder extraction system 46 comprises a secondary wall 47 between the vortex finder wall 50 and the center of the vortex finder 45. As seen in the embodiment of FIG. 6, the vortex finder wall 50 and the secondary wall 47 both have an angle towards the center of the cyclone 4. As seen in later embodiments, this is however not necessary.

Figure 7:
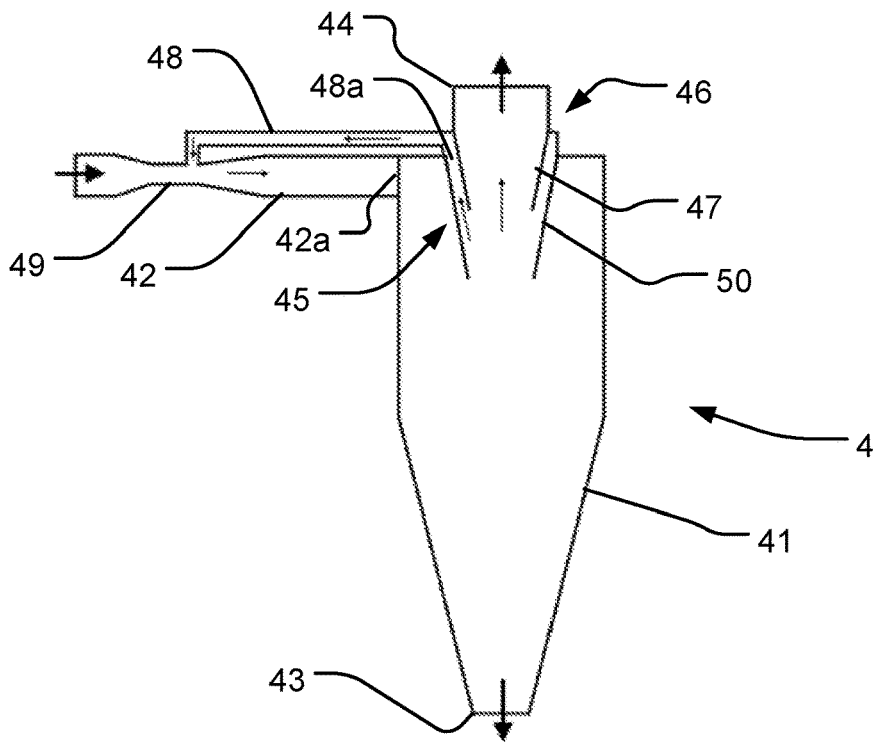
FIG. 7 is a cross-sectional view of a cyclone according to another embodiment of the invention.

FIG. 7 shows another embodiment of the invention, wherein the outlet pipe 48 of the secondary powder extraction system 46 is connected to the inlet pipe 42 of the cyclone 4, through a venturi duct 49 integrated in the inlet pipe 42. By using a venturi duct 49, no additional flow generating means are needed in the secondary powder extraction system 46. By recirculating the extracted powder several beneficial effects are achieved. First, the large particles, which have been otherwise lost in the cyclone are reintroduced into the inlet stream, and are therefore probable of flowing along the designed path to the powder outlet 43 at the bottom of the cyclone. Secondly, the small powder particles have a chance of agglomerating with either the other small particles in the inlet stream or the larger particles in the inlet stream. As such, the overall powder extraction increases.

It is noted that as the parts of the secondary powder extraction system 46 including the third outlet 48a are integrated in the cyclone and thereby located within the predefined circumference C of the cyclone 4, the cyclone according to the invention is very compact.

During operation of the cyclone 4 according to the invention, a mixed stream of air/gas and dried powder particles is supplied into the cyclone 4 through the inlet 42a.

A first part of the mixed stream, preferably consisting substantially of powder particles, is separated from the stream at the first powder outlet 43, and the first part of the mixed stream is extracted from the cyclone 4, A second part of the mixed stream is supplied to the vortex finder 45. This second part of the mixed stream comprises a third part, which is separated from the second part in the secondary powder extraction system 46 through the third outlet 48a.

The remaining part of the second part is extracted from the cyclone 4 through the second air/gas outlet 44 of the vortex finder 45.

Figure 8:
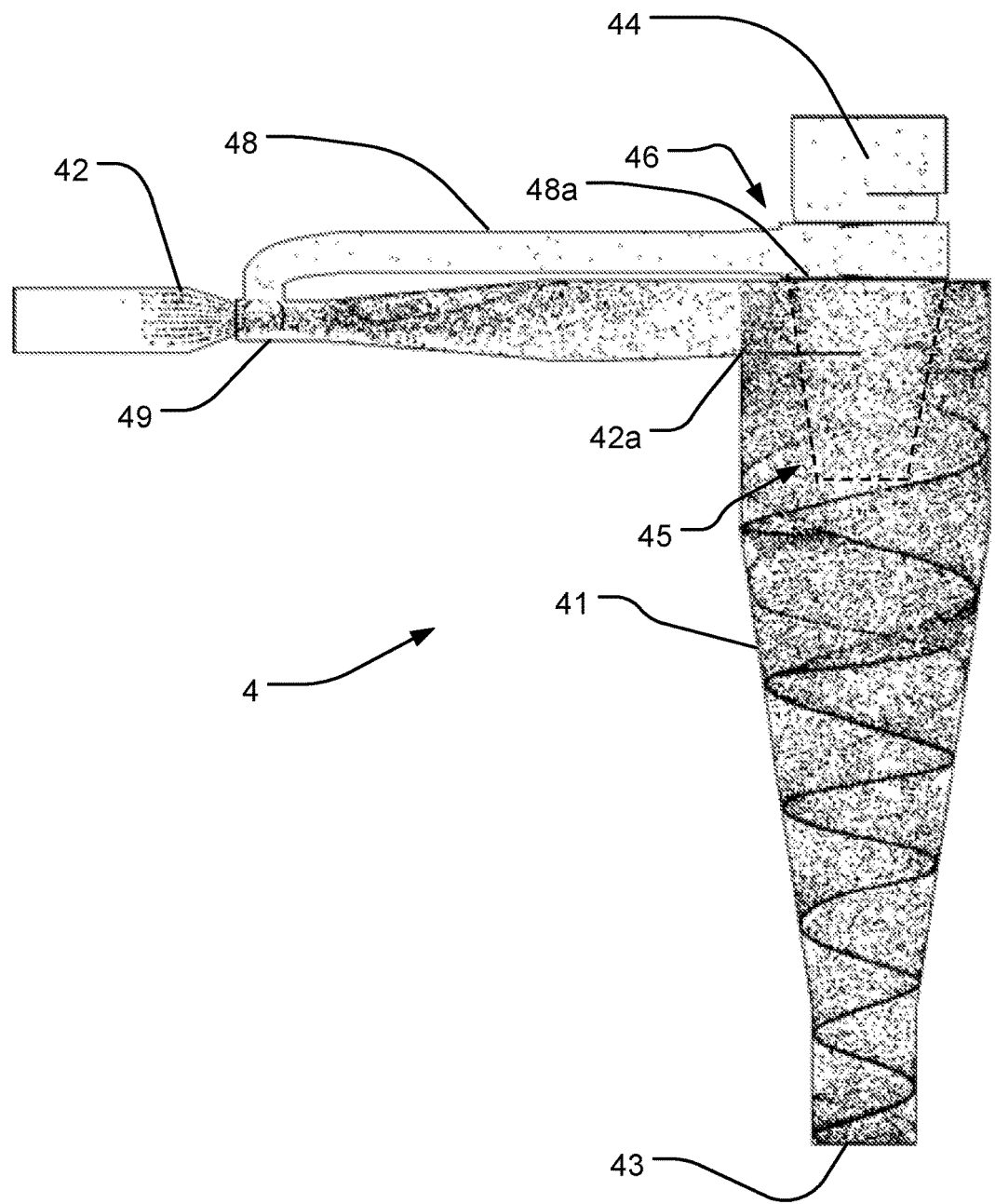
FIG. 8 shows a side view of the particle flow through a cyclone according to simulations of the embodiment of the invention shown of FIG. 7.
Figure 9:
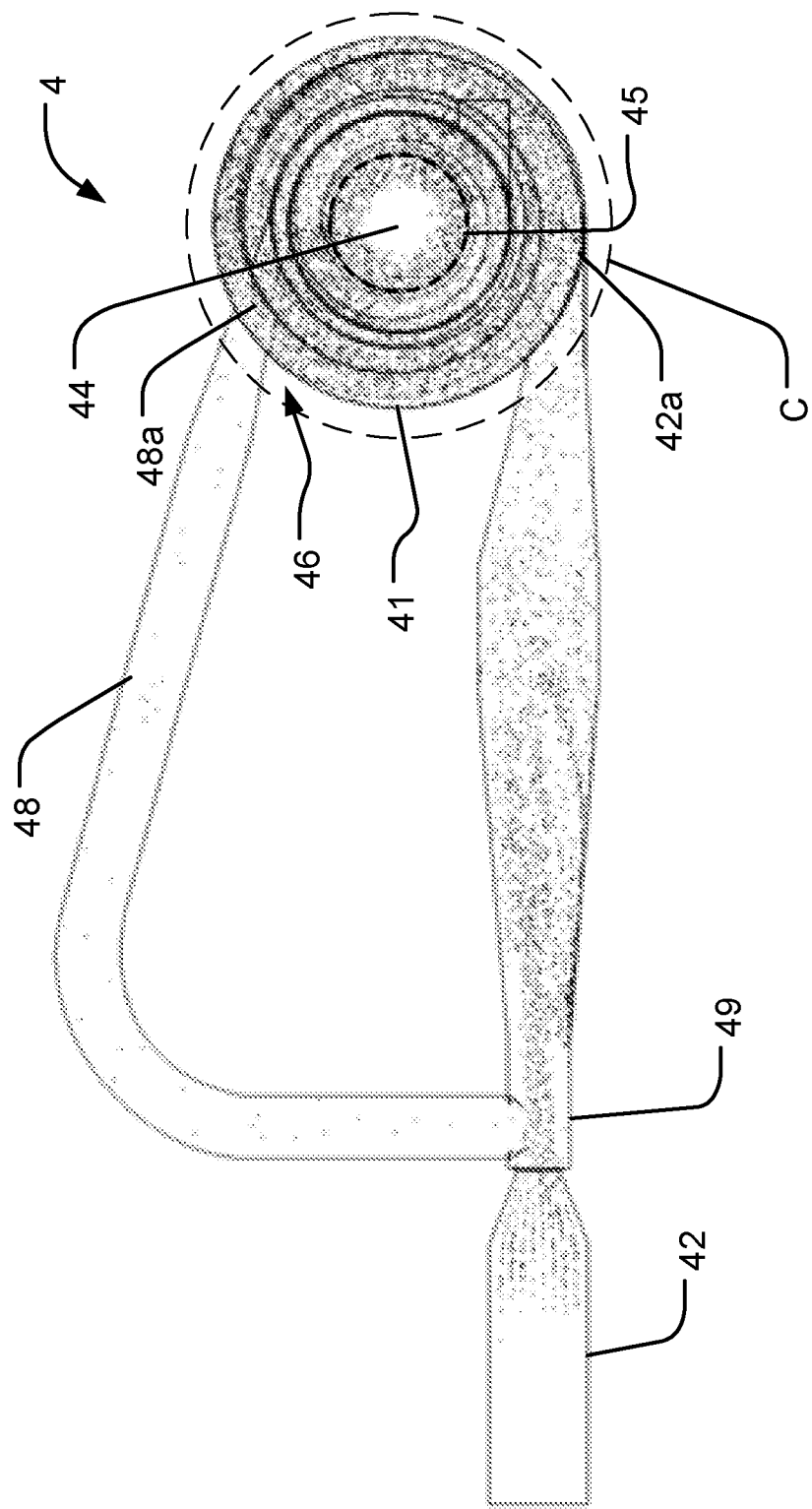
FIG. 9 shows a top view of the particle flow through a cyclone according to simulations of the embodiment of the invention shown of FIG. 7.

FIGS. 8 and 9 show a side and top view, respectively, of a cyclone 4 according to the embodiment shown in FIG. 7, during a simulation of the flow of powder particles and air/gas through the cyclone 4. These simulations are similar to those shown of a prior art cyclone in FIGS. 2 and 3. As seen on FIGS. 8 and 9 an amount of powder particles enter the secondary extraction system 46 and are recirculated through the third outlet 48a and further to an outlet pipe 48, into the venture duct 49 of the inlet pipe 42.

Figure 10A:
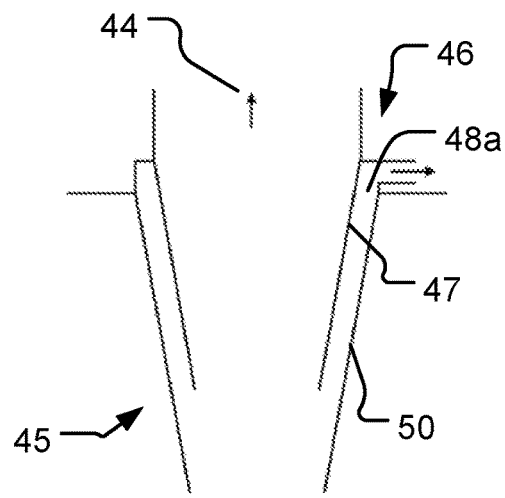
FIGS. 10a to 10d are cross-sectional views of a cyclone according to embodiments of the invention, showing different vortex finder designs.
Figure 10B:
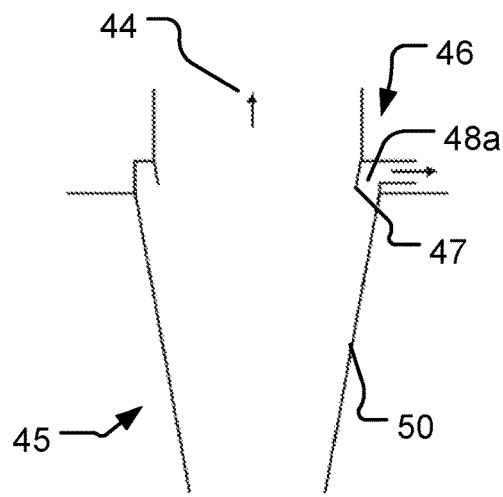

FIGS. 10a-10d show different embodiments of the invention, particularly different embodiments of the vortex finder 45 and secondary powder extraction system 46. FIG. 10a is similar to the embodiments shown in FIGS. 6 and 7. FIG. 10b shows a vortex finder 45 with a vortex finder wall 50 angled towards the center of the cyclone 4, as well as a secondary wall 47 of the secondary powder extraction system 46, which has a shorter wall length than that seen in FIG. 10a. By reducing the secondary wall length, the overall pressure drop over the cyclone decreases, and as such, the energy efficiency increases.

Figure 10C:
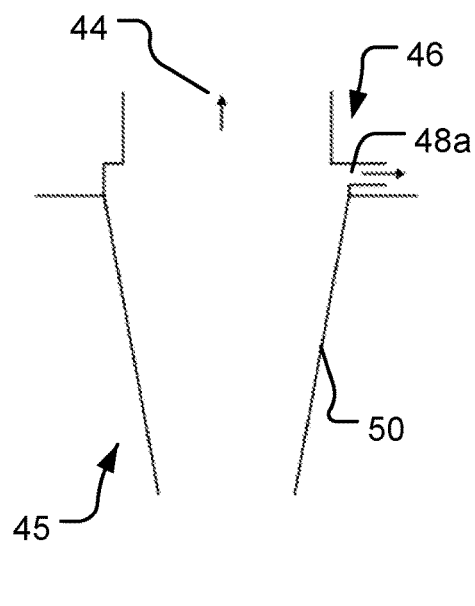

FIG. 10c shows a vortex finder 45 with a vortex finder wall 50 angled towards the center of the cyclone 4 as in FIGS. 10a and 10b, but the secondary powder extraction system 46 does not comprise a secondary wall. This further increases the energy efficiency of the cyclone, by decreasing the overall pressure drop over the cyclone 4. Further it makes the vortex finder 45 and secondary powder extraction system 46 easier to clean.

Figure 10D:
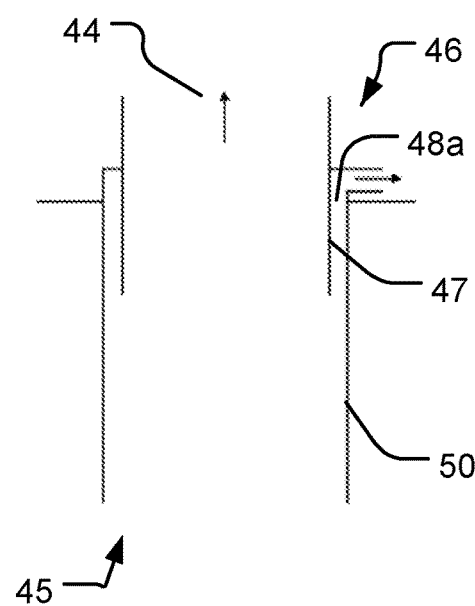

It is possible to adjust the angle of both the vortex finder wall 50 and the secondary wall 47. This can be done correspondingly to each other, or independently of each other. In FIG. 10d, both walls are perpendicular to the cyclone top, however it is more important that it illustrates an angle which is further from the center of the cyclone 4, than in FIGS. 10a-10c. By increasing the angle, more of the particles in the mixed stream moving towards the vortex finder 45 will enter the vortex finder 45. Thus a higher powder yield is gained. However this also results in a higher pressure drop over the cyclone, and thus a decrease in energy efficiency.

Figure 11A:
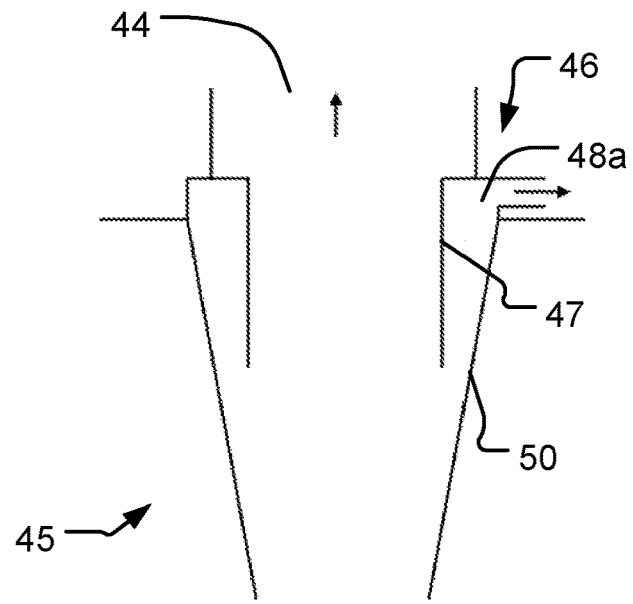
FIGS. 11a to 11b are cross-sectional views of a cyclone according to embodiments of the invention, showing different vortex finder designs.
Figure 11B:
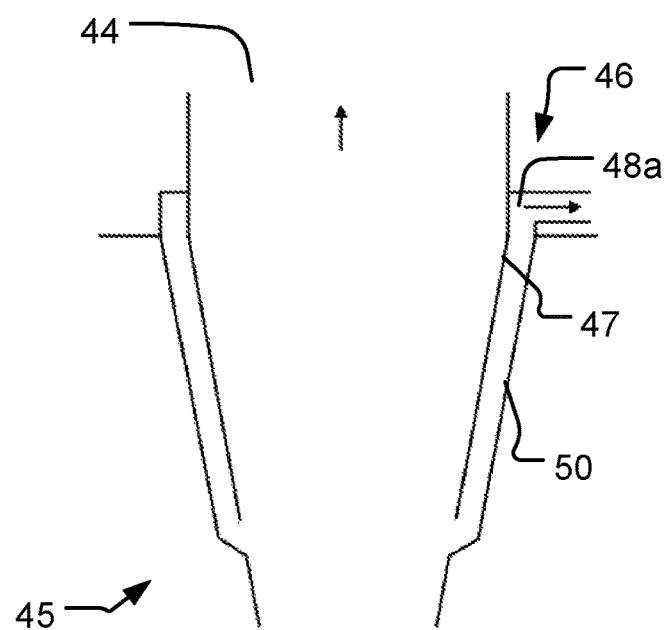

FIGS. 11a and 11b show further embodiments of the vortex finder 45 and secondary powder extraction system 46. FIG. 11a shows a vortex finder 45 having the vortex finder wall 50 angled towards the center of the cyclone 4, while the secondary wall 47 of the secondary powder extraction system 46 is substantially perpendicular to the cyclone top. By having this configuration, a combination of the advantages of different wall angles can be achieved.

FIG. 11b shows an embodiment of the invention, where the secondary wall 47 is parallel and concentric with a part of the vortex finder wall 50. By expanding the canal to the secondary powder extraction system outlet pipe 48, the powder particles are more efficiently extracted.

FIGS. 12a-12c show different embodiments of the cyclone, more specifically showing different ways in which the secondary powder extraction system outlet pipe 48 can be connected in a powder drying system 1. FIG. 12a shows a general case, similar to FIG. 6. FIG. 12b shows a recirculation setup similar to FIG. 7. FIG. 12c shows the secondary powder extraction system outlet 48 being connected as an inlet to a smaller cyclone 4'. The smaller cyclone 4' will extract more of the small sized powder particles. FIG. 12d shows an embodiment of the invention, wherein the secondary powder extraction system 46 is connected to a bag filter 8. The bag filter 8 can be smaller than bags filters 8 that would otherwise be used downstream of the air/gas outlet 44, as a smaller flow will enter through the secondary powder extraction system 46, and said flow will have a higher concentration of powder particles.

Figure 13A:
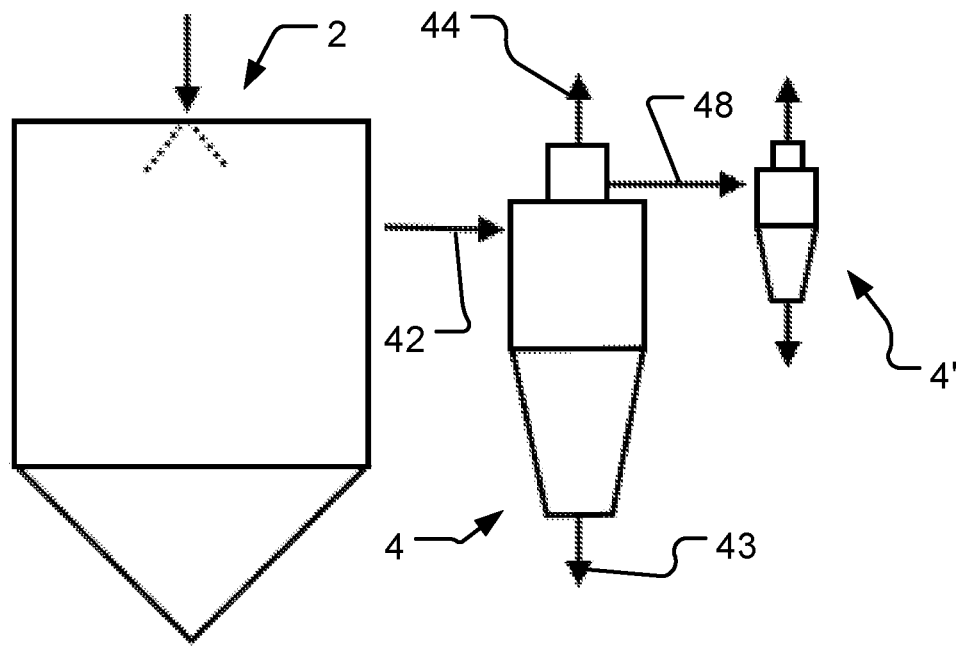
FIGS. 13a and 13b are schematic views of a powder drying system according to embodiments of the invention.
Figure 13B:
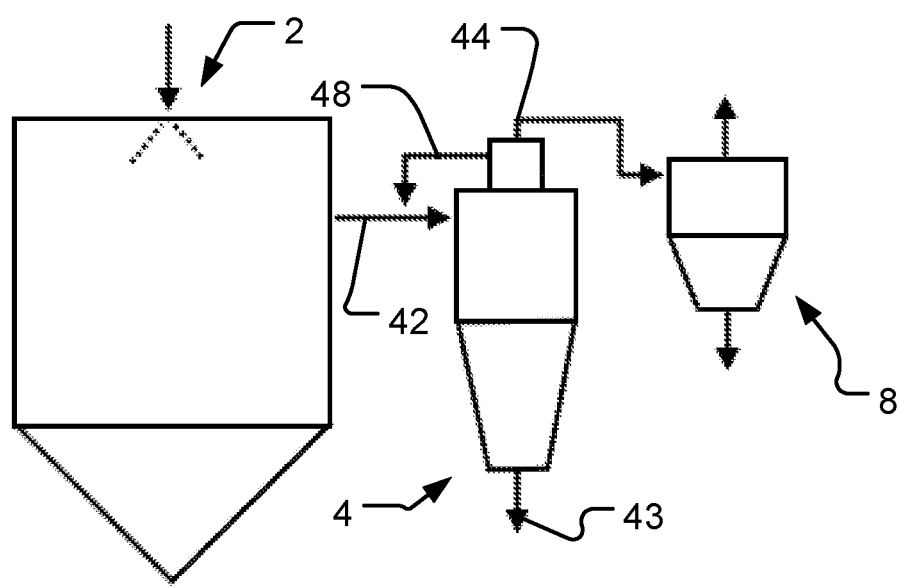

FIGS. 13a and 13b show embodiments of a second aspect of the invention, wherein a powder drying system 1 includes a powder drying processing unit 2 and a cyclone 4 according to the first aspect of the invention. In FIG. 13a, the powder drying system 1 further comprises a secondary cyclone 4', which is connected to the secondary powder extraction system 46 in a similar fashion as in FIG. 12c. In FIG. 13b, the secondary powder extraction system outlet 48 is connected to the cyclone inlet pipe 42, in a recirculation setup as in FIGS. 7 and 12b. Further the air/gas outlet 44 is connected to a bag filter 8, as is normal in a spray drying system 1.

The invention claimed is:

1. A cyclone for separation of solids and gases, said cyclone comprising:
   a predefined circumference;
   at least one inlet, for supplying a mixed stream of powder and air/gas;

a first outlet in the form of a powder outlet at the bottom of the cyclone for extracting powder; and a vortex finder at the top of the cyclone, the vortex finder comprising a vortex finder wall, a second outlet in the form of an air/gas outlet configured to extract air/gas from within the vortex finder, and a third outlet configured to extract powder particles from the mixed stream within the vortex finder, wherein the third outlet is part of a secondary powder extraction system of the cyclone, the third outlet comprising a tangential outlet configured to extract the powder particles from the mixed stream within the vortex finder.

2. A cyclone according to claim 1, wherein the secondary powder extraction system comprises a secondary wall inside the vortex finder, which is concentric to at least a part of the vortex finder and is placed between the vortex finder wall and an axis through a center of the vortex finder.

3. A cyclone according to claim 1, wherein the powder particles are adapted to be sucked into the third outlet of the secondary powder extraction system by use of a pump, fan, or other flow generating means.

4. A cyclone according to claim 1, wherein the vortex finder wall has a bent lower edge, such as to funnel the mixed stream into the vortex finder.

5. A cyclone according to claim 1, wherein the secondary powder extraction system is configured to recirculate said powder particles into the at least one inlet.

6. A cyclone according to claim 5, comprising an inlet pipe, which extends from outside of the predefined circumference to inside the predefined circumference, wherein the inlet pipe, leading to the at least one inlet, comprises a venturi duct, and wherein the cyclone comprises a pipe from the third outlet to the venturi duct, such that the powder particles extracted from the secondary powder extraction system are adapted to be sucked into the mixed stream, by a venturi effect caused by the venturi duct.

7. A cyclone according to claim 1, wherein the secondary powder extraction system transports the extracted powder particles into another dedusting system, another cyclone, a bag filter unit, or upstream into a powder drying system.

8. A powder drying system comprising a powder drying processing unit and at least one cyclone, the at least one cyclone comprising at least one inlet for supplying a mixed stream of powder and air/gas, a first outlet in the form of a powder outlet at the bottom for extracting powder, and a vortex finder at the top of the at least one cyclone, wherein the vortex finder further comprises a second outlet in the form of an air/gas outlet configured to extract air/gas from within the vortex finder, and a third outlet configured to extract powder particles from the mixed stream within the vortex finder, and wherein the third outlet is part of a secondary powder extraction system of the cyclone, and wherein the third outlet comprises a tangential outlet configured to extract the powder particles from the mixed stream within the vortex finder.

9. A powder drying system according to claim 8, wherein the secondary powder extraction system comprises a secondary wall inside the vortex finder, which is concentric to at least a part of the vortex finder and is placed between a vortex finder wall and an axis through a center of the vortex finder.

10. A powder drying system according to claim 8, wherein the powder particles are sucked into the third outlet of the secondary powder extraction system by use of a pump, a fan, or other flow generating means.

11. A powder drying system according to claim 9, wherein the vortex finder wall comprises a bent lower edge, such as to funnel the mixed stream into the vortex finder.

12. A powder drying system according to claim 8, wherein, the secondary powder extraction system recirculates said powder particles into the at least one inlet.

13. A powder drying system according to claim 12, wherein the at least one cyclone comprises an inlet pipe, which extends from outside of a predefined circumference of the at least one cyclone to inside the predefined circumference, wherein the inlet pipe, leading to the at least one inlet, comprises a venturi duct, and wherein the at least one cyclone comprises a pipe from the third outlet to the venturi duct, such that the powder particles extracted from the secondary powder extraction system are adapted to be sucked into the mixed stream, by a venturi effect caused by the venturi duct.

14. A powder drying system according to claim 8, wherein the secondary powder extraction system transports the extracted powder particles into another dedusting system, another cyclone, a bag filter unit, or upstream into the powder drying system.

15. A method for recovering powder particles in a powder drying system, the method comprising:
supplying a mixed stream of air/gas and dried powder particles into a cyclone through at least one inlet,
separating a first part of the mixed stream from the mixed stream at a first powder outlet,
extracting the first part of the mixed stream from the cyclone,
supplying a second part of the mixed stream to a vortex finder, the second part comprising a third part,
separating the third part from the second part in a secondary powder extraction system through a third outlet located in the vortex finder the third outlet comprising a tangential outlet, and
discharging a remaining part of the second part from the cyclone through a second air/gas outlet located in the vortex finder.

16. A method for recovering powder particles according to claim 15, wherein the third part is recirculated to the mixed stream at the inlet.

17. A method for recovering powder particles according to claim 15, wherein the third part is transported into another cyclone, a bag filter unit, or upstream into the powder drying system.

18. A method for recovering powder particles according to claim 15, wherein the first part of the mixed stream comprises substantially powder particles.

* * * * *